United States Patent [19]

Rawlings et al.

[11] 4,384,067

[45] May 17, 1983

[54] MINERAL-FILLED POLYCARBONATE COMPOSITIONS OF IMPROVED IMPACT STRENGTH

[75] Inventors: Herbert L. Rawlings, New Martinsville, W. Va.; Gerard E. Reinert, McMurray, Pa.

[73] Assignee: Mobay Chemical Corporation, Pittsburgh, Pa.

[21] Appl. No.: 323,015

[22] Filed: Nov. 19, 1981

[51] Int. Cl.$^3$ .................. C08L 67/02; C08L 69/00; C08L 23/24
[52] U.S. Cl. .................................... 524/493; 524/513
[58] Field of Search ................ 524/493, 513; 525/148

[56] References Cited

U.S. PATENT DOCUMENTS

| 3,437,631 | 4/1969 | Cleveland | 260/37 |
| 3,745,140 | 7/1973 | Segal | 524/493 |
| 3,862,998 | 1/1975 | Koehler et al. | 525/147 |
| 3,975,355 | 8/1976 | Bollen et al. | 524/513 |
| 4,018,738 | 4/1977 | Rawlings | 524/493 |
| 4,070,330 | 1/1978 | Rawlings | 524/493 |
| 4,172,859 | 10/1979 | Epstein | 524/513 |

Primary Examiner—Lewis T. Jacobs
Attorney, Agent, or Firm—Gene Harsh; Lawrence S. Pope; Aron Preis

[57] ABSTRACT

A mineral-filled thermoplastic composition comprising polycarbonate, poly(alkylene) terephthalate and polyanhydride resin characterized in an improved impact is disclosed.

8 Claims, No Drawings

MINERAL-FILLED POLYCARBONATE COMPOSITIONS OF IMPROVED IMPACT STRENGTH

FIELD OF THE INVENTION

This invention is directed to polycarbonate compositions and, more particularly, to mineral-filled aromatic polycarbonate molding compositions.

DESCRIPTION OF THE PRIOR ART

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required. In some applications, filled polycarbonates representing an attractive balance between the high level of the mechanical properties of the resin and the relative economy of the fillers have been used successfully.

Typically, a filler level of 5 to 30% by weight of the final molded article is acceptable from a cost standpoint, however, typical fillers such as talc, asbestos and similar fillers demonstrate great reductions in impact strength at these filler levels. This degradation in impact and other physical properties is thought to be attributable to the formation of stress concentrations in the vicinity of the individual filler particles causing propagation of cracks in the molded article.

Representative of the technology of mineral-filled polycarbonate resin in U.S. Pat. No. 4,070,330. Reinforcing of polyesters is taught in, for instance, U.S. Pat. No. 4,013,613 and U.S. Pat. No. 3,745,140, while novaculite-filled poly(butylene-terephthalate) compositions are disclosed in U.S. Pat. No. 4,018,738.

U.S. Pat. No. 3,975,355 is noted here for its teachings of a composition comprising polyethylene terephthalate, polycarbonate and a silica filler.

Also relevant in terms of the prior art is U.S. Ser. No. 258,817 which concerns a glass-filled polycarbonate composition comprising a polyanhydride resin which is a co-polymer of a α-olefin and maleic acid anhydride.

Polyanhydrides are reported as additives to molding compositions in U.S. Pat. No. 3,586,659 and as an ingredient of a cross-linked polyester composition in U.S. Pat. No. 3,732,337. Also noted in the same connection are U.S. Pat. No. 3,862,998 and U.S. Pat. No. 4,172,859 both disclosing polycarbonate compositions wherein incorporated are polyanhydrides.

In accordance with the present invention, a mineral-filled polycarbonate composition comprising poly(alkylene) terephthalate and a polyanhydride resin is provided, characterized by an improved level of impact strength.

SUMMARY OF THE INVENTION

A thermoplastic molding composition comprising aromatic polycarbonate, poly(alkylene) terephthalate, a polyanhydride resin and a mineral filler is provided characterized by its improved level of impact strength.

DETAILED DESCRIPTION OF THE INVENTION

When used herein "polycarbonate resin" means the neat resin without additives; "polycarbonate" means both the formulated polycarbonate resin with additives therein and also the final molded plastic product.

The polycarbonate resins useful in practice of the invention are produced by reacting di-(monohydroxyaryl)-alkanes or dihydroxybenzenes and substituted dihydroxybenzenes with derivatives of the carbonic acids such as carbonic acid diesters, phosgene, bischlorocarbonic acid esters of di-(monohydroxyaryl)-alkanes and the bis-chlorocarbonic acid esters of the dihydroxybenzenes and the substituted dihydroxybenzenes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert.-butyl groups. The alkyl residue of the di-(monohydroxyaryl)-alkanes linking the two benzene rings can be an open chain or a cycloaliphatic ring and may be substituted, if desired, for example, by an aryl residue.

Suitable di-(monohydroxyaryl)-alkanes are, for example, (4,4'-dihydroxy-diphenyl)-methane, 2,2'-(4,4'-dihydroxy-diphenyl)-propane, 1,1-(4,4'-dihydroxydiphenyl)-cyclohexane, 1,1-(4,4'-dihydroxy-3,3'-dimethyldiphenyl)-cyclohexane, 1,1-(2,2'-dihydroxy-4,4'-dimethyldiphenyl)-butane, 2,2-(2,2'-dihydroxy-4,4'-di-tert.-butyl-diphenyl)-propane or 1,1'-(4,4'-dihydroxydiphenyl) -1-phenyl-ethane; furthermore, methane derivatives which carry besides two hydroxyaryl groups and an alkyl residue with at least two carbon atoms and a second alkyl residue with one or more carbon atoms, such as, 2,2-(4,4'-dihydroxy-diphenyl)-butane, 2,2-(4,4'-dihydroxy-diphenyl)-pentane (melting point 149°–150° C.), 3,3-(4,4'-dihydroxy-diphenyl)-pentane, 2,2-(4,4'-dihydroxy-diphenyl)-hexane, 3,3'-(4,4'-dihydroxydiphenyl)-hexane, 2,2-(4,4'-dihydroxy-diphenyl)-4-methylpentane, 2,2-(4,4'-dihydroxy-diphenyl)-heptane, 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the aryl residues of which carry halogen atoms are, for instance, 2,2-(3,5,3',5'-tetrachloro-4,4'-dihydroxy-diphenyl)-propane, 2,2-(3,5,3',5'-tetrabromo-4,4'-dihydroxydiphenyl)-propane, (3,3'-dichloro-4,4'-dihydroxydiphenyl)-methane and 2,2'-dihydroxy-5,5'-difluorodiphenyl-methane. Suitable di-(monohydroxyaryl)-alkanes, the alkyl residue of which, linking the two benzene rings, is substituted by an aryl residue are, for instance, (4,4'-dihydroxydiphenyl)-phenyl-methane and 1,1-(4,4'-dihydroxydiphenyl)-1-phenyl-ethane.

Suitable dihydroxybenzenes and substituted dihydroxybenzenes are hydroquinone, resorcinol, pyrocatechol, methyl hydroquinone and the like. Other suitable dihydroxy aromatic compounds are 4,4'-dihydroxydiphenylene, 2,2'-dihydroxy-diphenylene, dihydroxynaphthalene, dihydroxy-anthracene and compounds represented by the structural formula:

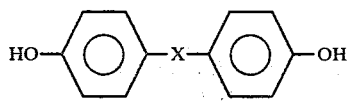

wherein X is

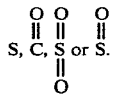

In order to obtain special properties, mixtures of various di-(monohydroxyaryl)-alkanes can also be used, thus, mixed polycarbonate resins are obtained. By far, the most useful polycarbonate resins are those based on 4,4'-dihydroxy-diaryl methanes and, more particularly, bisphenol A [2,2-(4,4'-dihydroxy-diphenyl)propane].

The polycarbonate resins are those having a weight average molecular weight from 10,000 to 200,000 and preferably a melt flow rate range of 1 to 24 g/10 min. (ASTM 1238) and are prepared by methods known to those skilled in the art and, more particularly, by methods disclosed in U.S. Pat. Nos. 3,028,365, 2,999,846, 3,248,414, 3,153,008, 3,215,668, 3,187,065, 2,964,974, 2,970,137, 2,991,273 and 2,999,835, all incorporated herein by reference.

Among the resins suitable in the practice of the invention are included phenolphthalic-based polycarbonate, copolycarbonates and terpolycarbonates such as are described in U.S. Pat. Nos. 3,036,036 and 4,210,741, both incorporated herein by reference.

The polycarbonates of the invention may also be branched by incorporating small quantities of polyhydroxyl compounds in them by condensation, e.g., 0.05–2.0 mol % (based on the quantity of bisphenols used). Polycarbonates of this type have been described, for example, in German OS Nos. 1,570,533; 2,116,974 and 2,113,347; British Pat. Nos. 885,442 and 1,079,821 and U.S. Pat. No. 3,544,514. The following are some examples of polyhydroxyl compounds which may be used for this purpose: phloroglucinol, 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-phenyl-4-isopropyl)-phenol; 2,6-bis-(2'-dihydroxy 5'-methyl-benzyl)-4-methylphenol; 2,4-dihydroxybenzoic acid; 2-(4-hydroxyphenyl)-2-(2,4-dihydroxyphenyl)-propane and 1,4-bis-(4',4''-dihydroxytriphenylmethyl)-benzene.

Other suitable branching agents for the practice of the invention are described in U.S. Pat. Nos. 3,897,392; 4,001,183; 3,544,514 and 3,541,049, all incorporated herein by reference. The preferred branching agent, isatin biscresol, is a member of a class of compounds collectively termed 3,3'-bis-(4-hydroxyaryl)-oxindoles corresponding to the general formula

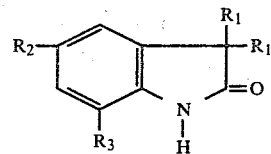

wherein $R_1$ denotes a 4-hydroxyaryl radical and $R_2$ and $R_3$ independently denote hydrogen or halogen; as described in U.S. Pat. No. 4,185,009, incorporated herein by reference.

The poly(alkylene) terephthalates suitable in the context of the present invention are thermoplastic polyesters which are normally crystalline polycondensation products of a difunctional organic alcohol or a reactive derivative thereof and a difunctional organic acid or a reactive derivative thereof. The alcohol may be aliphatic or mixed aliphatic-aromatic and the acid may be aromatic or mixed aliphatic-aromatic and in any case the organic groups may be straight-chained or branched, cyclic or polycyclic and may be unsubstituted or contain substituents such as alkyl, halogen, carboxyl, nitro, cyano amido, imido or like radicals. Typical of the polyesters suitable in the practice of the invention are poly(alkylene) terephthalates or mixed terephthalates and isophthalates wherein alkylene groups contain from 2 to 10, preferably from 2 to 6, carbon atoms. The most preferred are polyethylene terephthalate resins which are available commercially under such trade names as Tenite® 6685 or Tenite® 7741, both by Eastman Kodak Corporation, or which may be prepared by known techniques such as by the alcoholysis of esters of the phthalic acid with a glycol and subsequent polymerization and similar processes which are more fully described in U.S. Pat. Nos. 2,465,319, 3,047,539 and 3,516,957, all incorporated herein by reference.

The thermoplastic polyesters of the invention are further characterized in terms of their intrinsic viscosity—as measured in o-chlorophenol, a 60/40 phenol tetrachloroethane mixture or a similar solvent at 25°–30° C. The intrinsic viscosity may be at least 0.2 and preferably from about 0.4 to about 1.5 dl/g while the especially preferred resins will have a range of intrinsic viscosity of from 0.5 to 1.3 dl/g.

The polyanhydride resins suitable in the practice of the present invention are characterized by their structural formula:

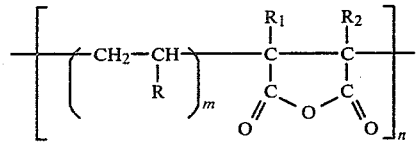

where R is a phenyl or an alkyl-substituted phenyl radical or an alkyl radical preferably having more than 4 carbon atoms and most preferably from about 12 to about 16 carbon atoms; in general, the carbon atoms of R may not be greater in number than 28; n is an integer of from 1 to 200; m is an integer of from 1 to 3; and $R_1$ and $R_2$ independently may be hydrogen atom or a $C_1$–$C_6$ alkyl. In the most preferred embodiment, n is about 145, m is 1 and both $R_1$ and $R_2$ are hydrogen atoms. Essentially the polyanhydride resin is a copolymer of maleic anhydride and an α-olefin, the preparation of which copolymer is described in U.S. Pat. No. 3,586,659, hereby incorporated by reference. Examples of olefin compounds or mixtures of olefins suitable for forming the polyanhydride component of the composition include: ethylene; 1-propane; 1-decene; 1-butene; 1-undecene; 1-isobutylene; 1-hexene; 1-dodecene; 1-pentene; 1-tridecene; 1-heptane; 1-octene; 1-tetradecene; 1-octadecene; 1-nonadecene; styrene; 1-nonene and mixtures thereof.

The copolymerization procedure may involve contacting the olefinic compound with the maleic anhydride in a suitable solvent in the presence of a catalyst. The molar ratio of the mono-α-olefin to maleic anhydride is desirably between about 1:1 and 3:1.

The preferred polyanhydride suitable in the practice of the invention is a copolymer of α-octadecene and maleic anhydride of a 1:1 molar ratio and is available from Gulf Oil Chemical Company under the tradename, PA-18. Typically, PA-18 is further characterized by its properties shown in the table below:

| Color/form | White powder |
|---|---|
| Molecular Weight | 50,000 |
| Specific Gravity | 0.97 |
| Melting point range | 110–120 |
| Inherent viscosity[1] | 0.10–0.13 |
| Viscosity @ 140° C.: (cps) | 20,000 |
| @ 160° C.: (cps) | 8,000 |
| Anhydride equivalent, meg/g | 3.10–3.25 |
| Neutralization equivalent, meg/g | 4.83–5.53 |
| Anhydride content, wt. % | 15–23 |
| Acid content, wt. % | 5–10 |
| Volatiles, % | <1 |
| Residual monomer | <3 |
| Thermal Stability @ 250° C. (wt. loss %) | 1 |
| @ 300° C. (wt. loss %) | 3 |
| @ 350° C. (wt. loss %) | 10 |
| @ 400° C. (wt. loss %) | 23 |

[1] 5 gm/100ml in methylisobutyl ketone at 77° F.

In the context of the invention, mineral fillers are any of a wide variety of materials well known as such in the art. Characteristically, any mineral which remains inert under the processing, or use, conditions of the composition and can be made available in suitable particles size may be used according to the invention.

The maximum particle size of the mineral fillers is generally under 100 micron and is preferably under 25 microns and most preferably between 3 and 10 microns. While no minimum particle size is set as a criterion in the present context particles smaller than 1 micron in size are relatively rare. Among the suitable minerals are the various form of silica, silicates, carbonates, clay, mica and asbestos. The preferred mineral filler is novaculite.

Novaculite is a unique natural crystalline form of quartz ($SiO_2$) which is found primarily in and around the Devonian-Mississippian deposits of Hot Springs, Ark. Petrographic Analysis of Novaculite shows imperfectly developed subhedral crystals having square and rectangular outlines. These anhedral crystals differ from the characteristic crystalline form of quartz which is in the Trigonal Trapexhohedral Class of the rhomobohedral sub-system of the Hexagonal system.

Uniquely novaculite has a minute grain size and individual crystals are usually between about 0.01 to 0.02 millimeter with a maximum of about 0.1 millimeter in size. The index of refraction of novaculite is about 1.550 and it is insoluble in hydrochloric acid. A more extensive description of novaculite may be found in Dan's System of Mineralogy by Frondel, Vol. III (1962), Wiley, New York and also in "Petrographic Analysis of Novacite ®/Novaculite" Malvern Minerals Company, 220 Runyon Street, P.O. Box 1246, Hot Springs National Park, Ark. Also in U.S. Pat. No. 3,740,371 incorporated herein by reference a further description of Novaculite fillers can be found. The novaculite mineral is sold under the tradename Novacite ® and particularly Novacite L337 and Novacite L207 having an average particle size of less than 5 microns and preferably 3 to 5 microns and particle size distributions of:

|  | Novacite L207 | Novacite L337 |
|---|---|---|
| 100% under | 10μ | 10μ |
| 50% under | 5μ | 5μ |
| 3% under |  | 1μ |
| 2% under | 2μ |  |
| Avg. Particle Size | 4μ | 3.45μ |

The impact properties of the mineral filled compositions of the present invention may be further improved by the addition of a silane coupling agent either to the polymeric resins or as a pretreatment to the mineral filler. The silane coupling agents are characterized by the structural formula:

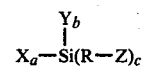

$$X_a\text{—Si}(R\text{—}Z)_c$$

wherein X is a hydrolyzable group, Y is a hydrogen or a monovalent hydrocarbon group, R is a divalent hydrocarbon group having from about 1 to about 20 carbon atoms, Z is a functional group described below, a is an integer from 1 to 3, b is an integer from 0 to 2, c is an integer from 1 to 3, and the sum a+b+c equals 4. Preferably a is equal to 3, b is equal to 0 and c is equal to 1.

Typical hydrolyzable X groups are halogen and hydroxy groups as well as alkoxy, cycloalkoxy, arlyoxy, alkoxy-substituted alkoxy such as B-methoxyethoxy, alkoxycarbonyl, aryloxycarbonyl, alkylcarboxylate, and aryl carboxylate groups, preferably having eight or less carbon atoms. Most preferably X is methoxy or ethoxy. Examples of the Y groups are hydrogen, methyl, ethyl, vinyl, isobutyl, phenyl and the like hydrocarbon groups, preferably having 10 or less carbon atoms. The R group can be any divalent hydrocarbon group having up to about 20 carbon atoms or preferably from about 2 to 18 carbon atoms. Typical R groups are ethylene, propylene butylene, decylene, phenyl and toluyl. In any event, the Z group is separated from the Si atom by at least 2 carbon atoms.

The Z functional group is reactive or at least capable of intimate association with the polycarbonate resin. Typical Z groups are amino, epoxy, vinyl, alkyl, methacryloxy and the like, with the preferred Z group being epoxy. Specific examples of coupling agents useful in the practice of the invention are
δ-aminopropyltriethoxysilane
δ-aminopropylphenyldimethoxysilane
δ-propionamidotriethoxysilane
N-trimethoxysilylpropyl-N(B-amino ethyl)amine
δ-glycidoxypropyltrimethoxysilane
3,4-epoxycyclohexyl-ethyltrimethoxysilane
δ-methacryloxypropyltrimethoxysilane
vinyltrichlorosilane
vinyltrimethoxysilane.

The silane coupling agent is incorporated into the compositions according to the inventions at a level of up to about 2 percent by weight and preferably up to about 1 percent by weight based on the weight of the mineral filler.

In the practice of the invention the molding compositions may contain between about 10 and about 40, preferably between 15 and 30, percent by weight of the mineral filler. The impact modifying polyanhydride may be present in the composition in an amount between 0.5 and 5, preferably between 1 and 3 percent by weight. The polycarbonate/poly(alkylene) terephthalate alloy may be present in an amount of 50 to 95, preferably 60 to 90, percent relative to the weight of the composition. While the weight ratio between polycarbonate to poly(alkylene) terephthalate in the alloy may be between 10:1 and 1:2, the preferred ratio is between 5:1 and about 2:1.

EXAMPLES

In the tables below, there are summarized the results of testing of compositions according to the invention set in comparison to prior art compositions. In the reported experiments Novacite® L337, a novaculite from Malvern Mineral Company was used as the mineral filler; the polycarbonate was Merlon M-50 from Mobay Chemical Corporation having a melt index of about 3.5–6 gm/10 min. per ASTM 1238; the polyanhydride resin was PA-18 available as such from Gulf Oil Chemicals Co. and the thermoplastic polyester was polyethylene terephthalate having an intrinsic viscosity of 0.65 and available from Eastman Kodak Corporation under the tradename Tenite®7741.

The compositions, including those of the prior art were prepared by blending and subsequent melt homogenizing by a single (or twin) screw extruder through a strand forming die. The chopped extrudate was later injection molded into test specimens. In all the exemplified compositions according to the invention, the weight ratio of polycarbonate to polyethylene terephthalate was 70/30 and all compositions contained about 65 ppm of phosphorus as antioxidant. The prior art compositions contained polyethylene (Microthene® FN510 from USI) a prior art impact modifier for polycarbonate based compositions.

TABLE I

| Novaculite % | impact modifier | concentration % | ⅛" Izod Notch ft·lb/in | Dart Impact ft·lb | Flexural Mod E-5 psi | Flexural Str E-3 psi | HDT 264 psi °C. |
|---|---|---|---|---|---|---|---|
| 15 | None | 0 | 0.9 | >105 | 4.6 | 16,000 | 120 |
| 15 | PA-18 | 1.0 | 1.4 | 85 | 4.4 | 14,400 | 119 |
| 15 | PA-18 | 2.0 | 2.2 | 73 | 4.3 | 14,000 | 121 |
| 15 | PE[1] | 0.5 | 0.9 | 94 | 4.4 | 15,400 | 122 |
| 15 | PE[1] | 1.0 | 1.0 | 105 | 4.4 | 15,000 | 118 |
| 22.5 | None | 0 | 1.2 | 87 | 5.2 | 15,100 | 118 |
| 22.5 | PA-18 | 2.0 | 1.8 | 50 | 4.6 | 12,800 | 111 |

[1]Microthene FN 510, USI

TABLE II

| Novaculite % | impact modifier | concentration | ⅛" Izod Notch ft·lb/in | ⅛" Izod Unnotch ft·lb/in | Dart Impact ft·lb | Flexural Mod E-5 psi | Flexural Str E-3 psi | HDT 264 psi °C. |
|---|---|---|---|---|---|---|---|---|
| 30 | None | 0 | 1.0 | 50 | 14 | 5.9 | 16,000 | 115 |
| 30 | PA-18 | 1 | 0.9 | 35 | 10 | 5.6 | 13,800 | 113 |
| 30 | PA-18 | 2 | 1.2 | 40 | 10 | 5.3 | 12,700 | 114 |
| 30 | PA-18 | 3 | 2.1 | 35 | 16 | 4.9 | 11,800 | 110 |

Dart impact tests are commonly used in the art and are conducted on molded discs (4 in. dia. × ⅛") of the material to be evaluated. The discs are mounted on a flat horizontal surface and a 10.43 pound weight having a 1 inch diameter steel tip thereon is dropped onto the disc from various heights. The height from which fifty percent of the specimens have failed, is designated the critical height for use in the determination of the Dart impact strength—see ASTM D-3029-72. In the course of testing, Izod impact strength was determined in accordance with ASTM-D-256. The flexural properties were determined per ASTM D-790 at 0.1"/min. and the heat deflection temperature was measured in accordance with ASTM D-648. It will be noted that the compositions according to the invention exhibit a marked improvement over prior art compositions in terms of reduced notched sensitivity under impact stress.

Although the invention has been described with reference to specific materials and conditions it is not to be limited, only as is set forth in the accompanying claims.

What is claimed:

1. A filled molding composition comprising:
   (a) an aromatic polycarbonate resin and
   (b) poly(alkylene) terephthalate wherein alkylene groups contain from 2 to 10 carbon atoms and
   (c) a polyanhydride resin characterized by the structural formula

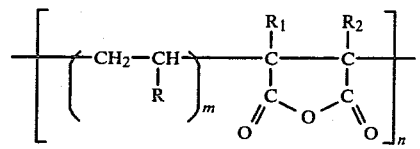

wherein R is selected from the group consisting of a phenyl radical, an alkyl substituted phenyl radical and an alkyl radical having more than 4 carbon atoms, m is an integer of from 1 to 3, $R_1$ and $R_2$ independently are a hydrogen atom or a $C_1$–$C_6$ alkyl and n is an integer of from 1 to 200 and
   (d) a mineral filler having a maximum particle size under 100 microns wherein said polyanhydride resin is present at an amount between 0.5 and 5% relative to the weight of the composition, and wherein said aromatic polycarbonate and said poly(alkylene) terephthalate relate by weight from 10:1 to 1:2.

2. The composition of claim 1 wherein said alkylene groups contain 2 carbon atoms.

3. The composition of claim 1 wherein said polyanhydride resin is a copolymer of α-octadecene and maleic and anhydride having a molar ratio of 1:1.

4. The composition of claim 3 wherein said mineral filler is novaculite.

5. The composition of claim 4 wherein said novaculite is of an average particle size of less than 5 microns.

6. The composition of claim 1 wherein said mineral filler is present in an amount between 10 and 40 percent by weight.

7. The composition of claim 1 or 2 or 3 wherein said mineral filler is present at an amount between 10 and 40 percent, said polyanhydride is present at an amount between 0.5 and 5 percent said percents relative to the weight of said composition, and said polycarbonate relates by weight to said poly(alkylene) terephthalate as from 10:1 to 1:2.

8. The composition of claim 1 or 2 or 3 or 4 or 6 wherein $R_1$ and $R_2$ are hydrogen atoms.

* * * * *